Nov. 29, 1927.  1,650,622
H. G. GEISSINGER
TEMPERATURE CONTROLLING SYSTEM
Filed Aug. 24, 1925  2 Sheets-Sheet 1

Inventor
Harry G. Geissinger
By Whittemore Hulbert Whittemore Belknap
Attorneys

Nov. 29, 1927. 1,650,622
H. G. GEISSINGER
TEMPERATURE CONTROLLING SYSTEM
Filed Aug. 24, 1925  2 Sheets-Sheet 2
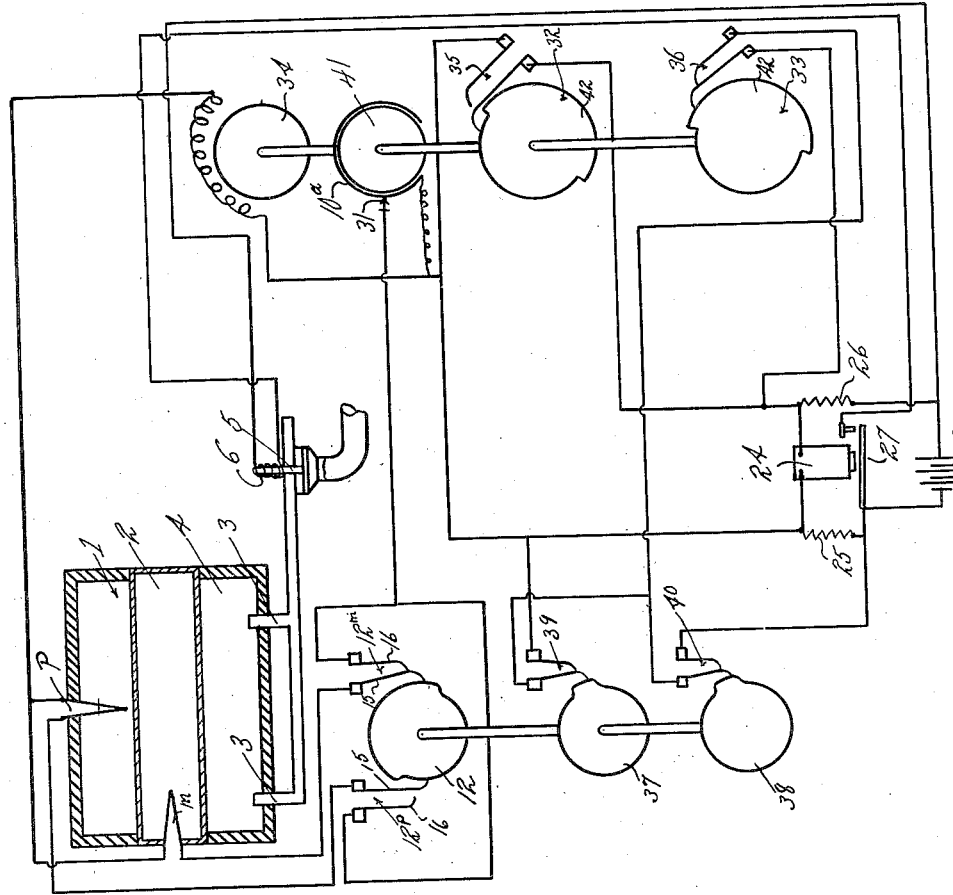
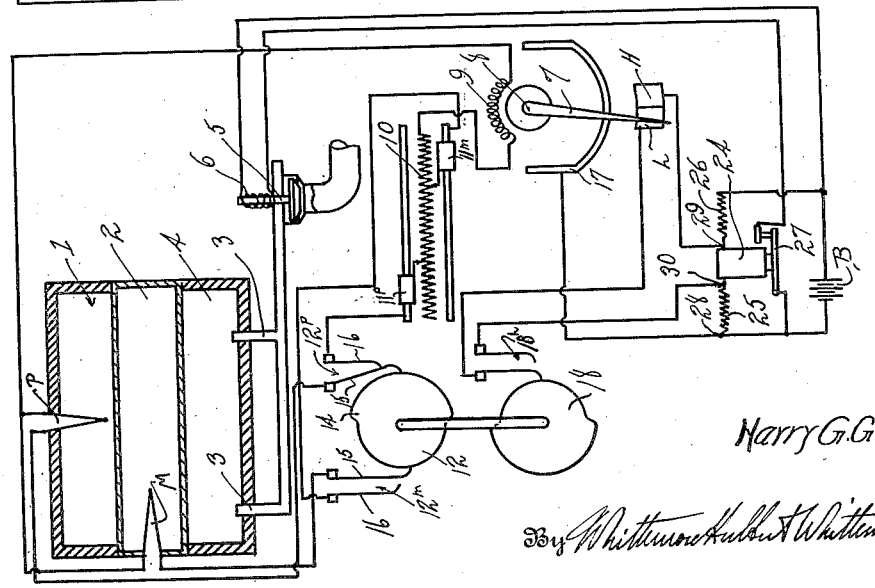
Inventor
Harry G. Geissinger Patented Nov. 29, 1927.

1,650,622

UNITED STATES PATENT OFFICE.

HARRY G. GEISSINGER, OF DETROIT, MICHIGAN.

TEMPERATURE-CONTROLLING SYSTEM.

Application filed August 24, 1925. Serial No. 52,243.

The invention relates to an improved method of temperature control for muffle type furnaces, the latter being characterized by the presence of a container for the stock heated, the outside of which is exposed to the heating medium. In such furnaces there is a pronounced time lag between the application of heat externally to the muffle and the transmission of the heat to the stock contained within the muffle.

When a furnace of this character has the heat input automatically regulated by means of a thermocouple within the muffle it always results in an application of heat outside of the muffle when a cold load is placed within the same and this temperature often becomes high enough to be destructive to the walls of the muffle before the load is brought to the required temperature.

The primary object of my invention is to provide an automatic temperature control device capable of protecting the muffle and parts external thereto from destructive temperatures during the period of heating up the contents of the muffle.

Another object is the provision of a control device operated by a thermometric instrument when above or below a predetermined point and the arrangement of the connections form two or more thermocouples in such a manner that said instrument registers at the same point for different actual temperatures of the several thermocouples.

A further object is to provide an arrangement permitting the adjustment of the control to closer temperature limits by eliminating the necessity for an insulating gap between the high and low contacting rings.

A still further object is to provide a control system which uses standard types of thermometric instruments with very few adjustments or changes.

These and other objects are attained by the novel construction hereinafter set forth.

In the drawings:—

Figure 2 is a slightly modified system utilizing the type of relay disclosed in my copending application Serial Number 686,157, filed January 14, 1924;

Figure 3 shows the system applied to a thermometric instrument of the recorder type.

Figure 1:
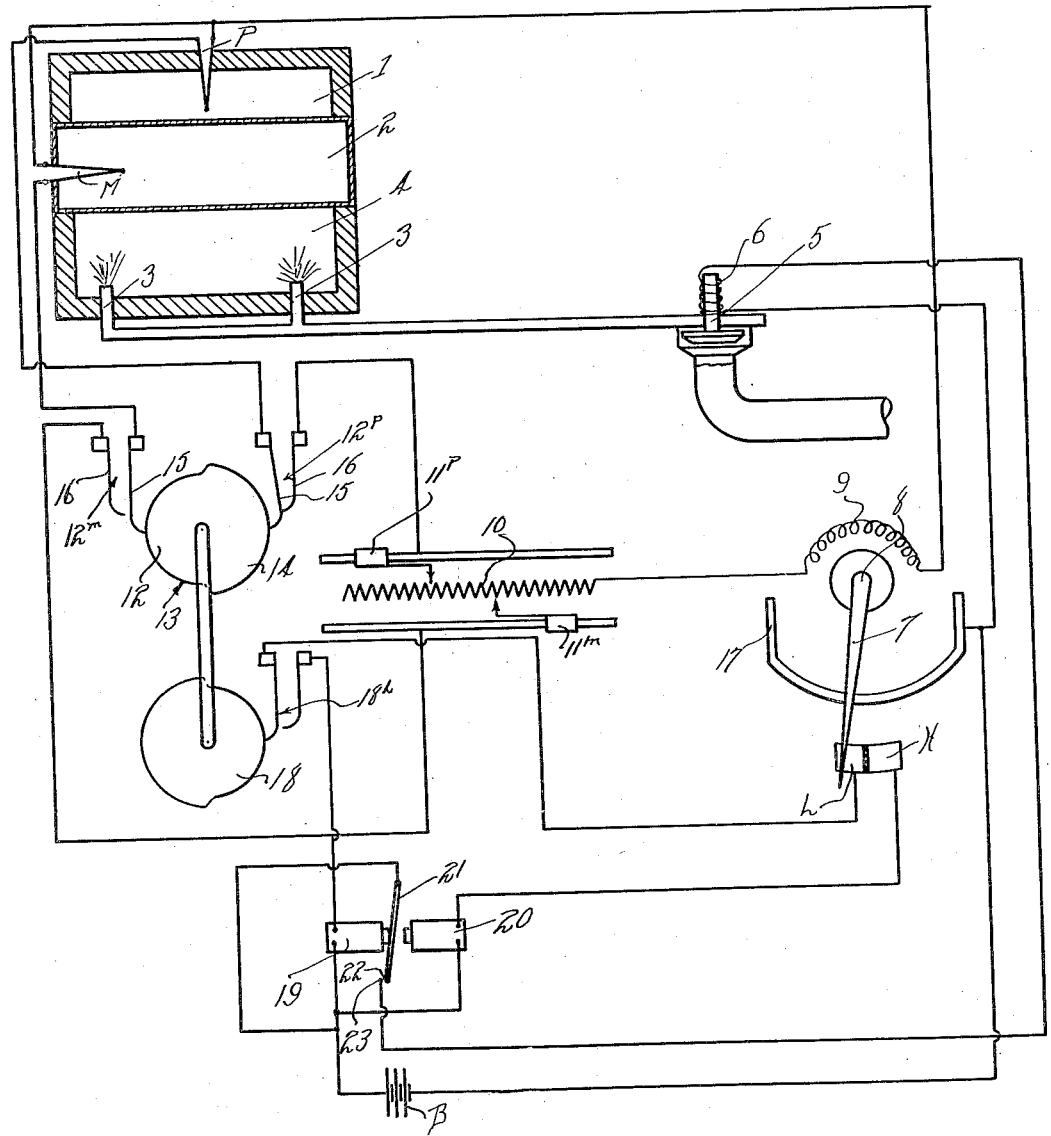
Figure 1 is an electrical diagram illustrating the improved temperature control system as applied to a temperature indicating instrument of a well known type.

My improved control system is adapted to be used with a heat input mechanism having a single valve having maximum and minimum positions of adjustment and actuated by a suitable relay. This relay is itself controlled alternately by two or more thermocouples located in different portions of the furnace so as to be subjected to different temperature conditions. Usually the first, or master thermocouple is located within the muffle of the furnace, while the second, or protective thermocouple is located externally of the muffle. The two thermocouples are connected to a thermometric instrument and are arranged to alternately operate the same to indicate the temperature of the respective couples. When the master thermocouple registers above a certain predetermined temperature, the heat input mechanism is adjusted to its minimum position. The protective thermocouple has its critical temperature set considerably above that of the master thermocouple and is so arranged that whenever this temperature is exceeded the heat input mechanism will automatically be adjusted to minimum position, while when the protective couple is below its critical temperature, the automatic regulation is determined solely by means of the master thermocouple.

Thermometric instruments capable of actuating high and low circuits are of two general types, those in which the contacting circuits are continuous and those in which circuits are intermittent. Figures 1 and 2 illustrate the application of the protective control to instruments of the intermittent type.

Referring now more specifically to the system illustrated in Figure 1, the furnace 1 is provided with a muffle 2 with burners 3 and combustion chamber 4. The fuel supply to the burners is controlled by means of a suitable mechanism and as illustrated, this comprises the gravity closed valve 5 opened by the energization of a solenoid 6. The master thermocouple M is preferably arranged within the muffle 2 to indicate the temperature of the load within the muffle, while the protective couple P is arranged adjacent to the external wall of the muffle.

The thermometric instrument is illustrated in Figure 1 as comprising a pointer 7 pivotally mounted at 8 and adapted to respond to the galvanometer coil 9. This coil is connected to resistance 10 and the latter is provided with two slidable contacts $11^p$ and $11^m$. 12 represents a commutator constantly rotating by suitable mechanism not shown and arranged to alternately close the contacting devices $12^p$ and $12^m$. As specifically illustrated, the commutator comprises the rotor 13 having a raised segment 14 extending around substantially one-half of the circumference thereof. Each of the contacting devices $12^p$ and $12^m$ comprising a pair of spring arms 15 and 16, the arm 15 bearing against the periphery of the rotor 13 and adapted to make contact with the arm 16 during the interval when the raised segment 14 registers with the same. The contacting device $12^p$ is arranged in circuit with the thermocouple P and the sildable contact $11^p$, while the contacting device $12^m$ is correspondingly connected to the thermocouple M and the sliding contact $12^m$. It will be apparent therefore, that the thermocouples M and P are alternately connected in operative relation to the thermometric instrument so that the pointer 7 indicates the temperature of one and then the other.

It will be readily understood by those familiar with thermometric instruments that in a voltmeter type of indicator the resistance 10 is a part of the adjusting resistance and that by varying the positon of the slide contacts $11^p$ and $11^m$, it is possible to adjust the instrument so that the pointer 7 will register at the same point when the thermocouples M and P are actually at different temperatures. Preferably the contacting slide $11^m$ is adjusted so that the instrument registers the actual temperature of thermocouple M while the slide contact $11^p$ is arranged to register a temperature lower than the actual temperature of the thermocouple P.

L and H represent the low and high contacts respectively which are adapted to be closed by the pointer 7 when the depresser bar 17 is intermittently actuated. The contacts L and H are insulated from each other and are preferably adjustable so that the position of the pointer 7 above or below a predetermined temperature will cause the same to contact with one or the other. 18 is a second commutator, mechanically connected to the commutator 12 to be driven in timed relation thereto and provided with the contacting device $18^p$ arranged to be closed during the same interval that the contacting device $12^m$ is also closed. 19 and 20 are relays controlling the position of the armature 21, the latter carrying a contact 22 adapted to close against the contact 23 when the relay 19 is energized. B is a battery or other source of electrical energy connected to the relays 19 and 20 and to the armature 21.

The other terminal of the battery is connected to the depresser bar 17 and to the solenoid 6. The high circuit includes the contact H and relay 20, while the low circuit includes the contact L, contacting device $18^p$ and relay 19.

The operation of the system as above described is as follows: During the period when the muffle load and the master thermocouple M are below the predetermined critical temperature for which the instrument is set, and during the half period in which contacting devices $12^m$ and $18^p$ are closed, the pointer 7 will contact with L thereby closing the low circuit through the contacting device $18^p$ and relay 19. The armature 21 will thus be drawn to the left, thereby closing the circuit through the solenoid 6 and resulting in the maximum heat input to the furnace.

If during the heating up of the muffle contents while the master thermocouple is still below its critical temperature, the temperature of the muffle rises above its critical setting as determined by the position of the contacting slide $11^p$, then during the half period when the contacting device $12^p$ is closed by commutator 12 the pointer 7 will now contact with H thereby energizing the relay 20 and opening the circuit through the solenoid 6. This will result in the closing off of the main fuel supply, but during the next half period of the commutator 12, since the thermocouple M is still below its critical temperature, the heat input will again be turned on. Thus, when the protective couple is above its critical and the master couple is below its critical, the heat input to the furnace is alternately turned on and off and this will prevent the possibility of the muffle being heated to a destructive temperature.

When the contents of the muffle reach the predetermined standard temperature and during the period when contacting device $12^m$ is closed, the high circuit is established through the relay 20 with consequent reduction of the fuel input by the valve 5. During the soaking period, the temperature of the load and the master couple M cross and recross the critical degree and during the periods of closure of contacting devices $12^m$ and $18^p$, the fuel input is regulated by the contact made by the pointer 7 either with the contact H or L. During the soaking period the muffle wall and protective couple P gradually fall to a lower temperature but the fuel supply cannot be turned on by the protective couple since the contacting device $18^p$ is always open when the protective couple is operatively connected to the instrument. If, from any accidental reason, the master couple M fails to function the contents of the muffle are limited to the temperature standard of the protective couple P. In practice, the protective temperature is generally set from 50 to 100 degrees above the standard for the muffle load so that my system is doubly protected for muffle and contents.

In the system as above described it was stated that the resistance 10 was coupled in series with the galvanometer coil 9 in an instrument of the galvanometer type. My system however, is equally applicable to an instrument of the potentiometer type and in this case, the resistance 10 represents part of the slide wire of the instrument while the contacts 11$^p$ and 11$^m$ represent two different temperatures to be balanced by the mechanism. This will be readily understood by those familiar with the potentiometer type of instrument.

Figure 2 represents a modified form of control adapted for use with either the galvanometer or potentiometer type of instruments in which I have utilized the improved form of relay control described in my copending application Serial Number 686,157, filed January 14, 1924. In this case, the relay 24 is connected continuously in circuit with the battery B through the resistances 25 and 26 and these resistances are so proportioned that when in circuit, the relay 24 is energized sufficiently to hold the switch arm 27 closed, but insufficient to actuate the same if previously opened. The depressor bar 17 is electrically connected to the point 28 of the relay circuit. The high contact H is connected to the point 29 and the low contact L is connected to the point 30 through the contacting device 18$^1$. Thus, whenever the pointer 7 closes the contact H the relay 24 is short circuited, thus de-energizing the same and releasing the switch arm 27. When the pointer 7 contacts with L the resistance 25 is short circuited providing the contacting device 18$^1$ is also closed, this resulting in the energization of the relay 24 sufficiently to positively close the switch arm 27 even when previously in open position.

Figure 3 illustrates the application of my protective control system to a thermometric instrument of the continuous circuit type such as is found in recorders. Instruments of this type are equipped with contacting discs rotatable by suitable mechanism into positions that represent the temperatures of the attached thermocouples. Such instruments, however, must be modified in several respects in order to provide my improved system and in addition, two special commutators are added to the equipment.

In a recorder type instrument it is apparent that it would not be desirable to have the master and protective couples both indicate at the same point on the recorder as was the case in the indicating instruments previously described. Therefore, it is necessary to provide separate controlling devices operable by the protective and master thermocouples since each has a different critical temperature. As illustrated in Figure 3 the commutator 12 is similar to one previously described and serves to alternately connect the master and protective couples into operative relation to the instrument. No attempt has been made to accurately illustrate all of the various parts of the recording instrument since it is very difficult to represent simply and is well understood by those familiar with the art. Certain parts, however, are diagrammatically illustrated to show how the various parts cooperate in my control system. 34 represents a mechanism for automatically adjusting the instrument to correspond with the temperature of the attached thermocouple, this mechanism being mechanically connected to a rotating element 41 and to the rotating discs 32 and 33. The slide wire 10$^a$ is arranged peripherally on the rotating element 41 and makes electrical connection with the contact 31, the latter being connected to both the contacting devices 12$^p$ and 12$^m$. It will be understood that when either of the thermocouples is connected to the contact 31, the rotating device 34 is automatically adjusted until the contact 31 reaches a point of balance on the slide wire 10$^a$ and thus the positions of the discs 32 and 33 correspond to the temperature of the thermocouple. 35 and 36 are contacting devices or circuit closers cooperating respectively with the protective disc 32 and the master disc 33, these discs being each provided with raised portions or cams 42. The position of the cams 42 is adjusted so that when the thermocouple reaches its critical temperature, the contacting devices 35 and 36 will be closed and since each disc corresponds to a different critical temperature, the cams on the respective discs will be set at different angular positions. 37 and 38 are additional commutators mechanically connected to the commutator 12 so as to rotate in time therewith. 39 and 40 are contacting devices cooperating with the commutators 37 and 38 and the arrangement is such that both contacting devices are closed for a brief interval at the end of the period during which the contacting device 12$^m$ is closed. The various contacting devices are electrically connected to each other as illustrated in Figure 3 and are also connected to a relay circuit of the type described and illustrated in Figure 2.

The operation of the system is as follows: During the period of heating up of the muffle contents the contacting device 36 is open while the master thermocouple is connected in operative relation to the instrument. While the master couple is still connected to the instrument through contacting device 12$^m$, both of the contacting devices 39 and 40 are also closed for a brief interval and this results in short circuiting the resistance 25 and consequently energizing the relay 24 to turn on the fuel supply. During the next half period when the protective couple is connected to the instrument if the temperature outside of the muffle is above the critical, the contacting device 35 is closed thereby completing the circuit around the latter and relay 24 thus deenergizing the latter and closing the valve 5. In the following half period the contacts 39 and 40 will again close the relay 24 so that under the conditions of low temperature within the muffle and high temperature outside the same, the heat input to the furnace is turned on for only one-half of the time and this will prevent excessive temperatures outside of the muffle. As soon as the master-thermocouple has reached the critical temperature the contacting device 36 is closed and as soon as the contacting device 40 is also closed, the relay 24 will be short circuited thereby opening the switch arm 27. In the next half period, however, with the protective couple controlling, if the disc 32 is below its critical temperature there will be no change in the condition of the heat input mechanism since the only method of opening the valve 5 is by reason of the closing of contacting devices 39 and 40 and the latter are never closed while the protective couple is in control.

In all of the various types of apparatus as above described, it will be apparent that I have provided a control system for governing the heat input to the furnace according to the temperature of the master thermocouple and that, moreover, provision is made to place the heat input mechanism on half time maximum fuel input whenever the protective thermocouple is above its predetermined temperature, while the circuits are so arranged that a sub-normal temperature of the protective thermocouple has no effect upon the heat input mechanism.

What I claim as my invention is:—

1. In a temperature control system, the combination with a pair of thermocouples, and a thermometric instrument adapted to cooperate therewith, said instrument including an electrical resistance, of means for alternately connecting said thermocouples in operative relation to said instrument, a pair of contacts cooperating with said resistance and the respective thermocouples, said contacts being adjustable to cause said instrument to register a certain indicated temperature when said thermocouples are at varying actual temperatures, and a single heat input mechanism controlled by the said thermometric instrument.

2. In a temperature control system, the combination with a pair of thermocouples, and a thermometric instrument adapted to cooperate therewith, of means for alternately connecting said thermocouples in operative relation to said instrument, means for causing said instrument to register at the same point when said thermocouples are at different temperatures, a pair of control circuits, a heat input mechanism having two positions of adjustment controlled by the respective circuits, means for alternately closing said circuits when said instrument registers higher or lower than a predetermined point, and means for preventing the closing of one of said circuits during the period when said instrument, while responsive to one of said thermocouples, registers lower than said predetermined point.

3. In a temperature control system, the combination with a master thermocouple and a protective thermocouple arranged to be responsive to temperatures at different portions of a furnace, and a cooperating thermometric instrument, of means for alternately connecting said thermocouples to said instrument, means for causing said instrument to register at the same predetermined point when said master and protective thermocouples are at different temperatures, high and low control circuits, a heat input mechanism having two positions of adjustment controlled by the respective circuits, means for alternately closing said circuits when said instrument registers higher or lower than said predetermined point, and means for preventing the closing of the low circuit when said protective thermocouple is connected to said instrument.

4. In a temperature controlling system, the combination with a master thermocouple and a protective thermocouple arranged to be responsive to different temperatures, and a cooperating thermometric instrument, of a rotary mechanism having a plurality of contacting devices associated therewith adapted to be opened and closed in predetermined timed relation, two of said contacting devices being arranged to alternately connect said master and protective thermocouples into operative relation with said instrument, and another of said contacting devices being timed to close when said master thermocouple is indicating and to open when said protective couple is indicating, high and low control circuits connected to said instrument, said low circuit including the last mentioned contacting device and a heat input mechanism having two positions of adjustment controlled respectively by said high and low circuits.

5. In a temperature control system, the combination with a furnace, heat input mechanism having two positions of adjustment, a pair of thermocouples and a thermometric instrument, of a rotating mechanism having a plurality of contacting devices associated therewith, adapted to be opened and closed in predetermined timed relation, two of said contacting devices being arranged to alternately connect said thermocouples to said instrument, control means for said heat input mechanism having a low and a high circuit, said low circuit including another of said contacting devices, the latter being opened when said protective thermocouple is connected to said instrument and being closed during a portion of the period when said master thermocouple is connected to said instrument.

6. In a temperature control system, the combination with a master thermocouple and a protective thermocouple and a thermometric instrument connected therewith, of a contacting device operated when said instrument registers above a predetermined temperature corresponding to the master thermocouple, a second contacting device operated when said instrument registers above a second predetermined temperature corresponding to said protective thermocouple, two contacting devices operated periodically independent of temperature, a continuously closed circuit including a relay and a resistance, a heat input mechanism having two positions of adjustment controlled by said relay, and connections between said circuit and the various contacting devices whereby said resistance is short circuited when said periodically operated device is closed, whereby said relay is short circuited when said contacting device is closed, and whereby said relay is also short circuited when both the first mentioned of said contacting devices and one of said periodically operated devices are simultaneously closed.

7. In a temperature control system, the combination with a master and protective thermocouple, a thermometric instrument, means for alternately connecting said thermocouples to said instrument, a mechanically driven commutator, a heat input mechanism, a relay for operating the same and a resistance in circuit with said relay, of means for periodically short circuiting said resistance whereby said relay is energized, a pair of contacting devices controlled by the position of said thermometric instrument, one of said devices being set for a predetermined temperature of the master thermocouple and the other for a different predetermined temperature of the protective thermocouple, the contacting device of said protective couple being adapted when closed to positively short circuit said relay, and said other contacting device when closed being adapted to short circuit said relay only when said commutator is also closed.

In testimony whereof I affix my signature.

HARRY G. GEISSINGER.